2,773,109
ETHYLBENZENE DISPROPORTIONATION

Arthur P. Lien, Highland, Ind., and David A. McCauley, Chicago, Ill., assignors to Standard Oil Company, Chicago, Ill., a corporation of Indiana No Drawing. Application July 20, 1954, Serial No. 444,672

6 Claims. (Cl. 260—671)

This invention relates to the disproportionation of ethylbenzene to a mixture of diethylbenzene and triethylbenzene wherein the triethylbenzene predominates.

Earlier work on the disproportionation of ethylbenzene in the presence of $HF$-$BF_3$ treating agent has indicated that diethylbenzene is the predominant disproportionation product and under certain conditions the only polyethylbenzene produced (U. S. 2,528,893). It has further been thought necessary in the previous work that triethylbenzene in large yield could be obtained only by disproportionating diethylbenzene in the presence of $HF$-$BF_3$ treating agent (U. S. 2,644,017). At the present time, a market has developed for both diethylbenzene and triethylbenzene, preferably the 1,3-diethylbenzene and the 1,3,5-triethylbenzene. Economic considerations make it most desirable that both of these polyethylbenzenes be obtainable in high yield directy from the monoethylbenzene.

An object of the invention is a process for the production of 1,3-diethylbenzene and 1,3,5-triethylbenzene in high yield by the disproportionation of monoethylbenzene.

A particular object of the invention is a process for the disproportionation of ethylbenzene to a reaction product containing diethylbenzene and triethylbenzene wherein the triethylbenzene yield predominates over the diethylbenzene yield.

A reaction product mixture containing 1,3-diethylbenzene and 1,3,5-triethylbenzene wherein the triethylbenzene predominates over the diethylbenzene is obtained when ethylbenzene is contacted under substantially anhydrous conditions in the absence of reactive hydrocarbons with $HF$-$BF_3$ treating agent at a temperature of at least about 75° C. for a sufficient time. The liquid HF is present in an amount of at least about 3 moles, preferably between about 6 and about 12 moles per mole of ethylbenzene. At least about 0.4 mole, preferably about 1 mole, of $BF_3$ is present per mole of ethylbenzene. An essentially constant yield of diethylbenzene and triethylbenzene is obtained at a temperature between about 80° C. and about 140° C. when the reaction is carried out for a time between about one-half hour and about 3 minutes, the longer times corresponding to the lower temperatures.

In order to obtain a reaction product mixture wherein the triethylbenzene component predominates over the diethylbenzene component, it is necessary to control both the temperature and the time of contacting. A reasonably short time of contacting produces a reaction product mixture wherein the triethylbenzene component predominates over the diethylbenzene component when the contacting is carried out at a temperature of about 75° C. As the temperature of contacting is increased, the time of contacting needed to produce the predominantly triethylbenzene disproportionation product decreases. Temperatures as high as 175° C. or even higher may be utilized; however, the operation at these high temperatures results in side reactions such as cracking and tar formation even when the time of contacting is very short.

The ethylbenzene disproportionation reaction appears to reach the constant reaction product distribution when sufficient time is given at the particular temperature. The essentially constant product distribution contains about 15 mole percent of 1,3-diethylbenzene and about 23 mole percent of 1,3,5-triethylbenzene. It is preferred to operate at a temperature between about 80° C. and about 140° C. At these temperatures, the substantially constant reaction product distribution is obtained at times of contacting between about one-half hour and about 3 minutes, the longer times corresponding to the lower temperatures. The particular preferred conditions of temperature and time are about 100° C. and about 15 minutes.

In addition to the ethylbenzene, the feed may contain non-reactive liquid hydrocarbons. It is to be understood that the term "non-reactive liquid hydrocarbons" means those hydrocarbons which are liquid at operating conditions and which are essentially inert to the action of the $HF$-$BF_3$ agent and do not participate in any reaction with the ethylbenzene charged. Examples of reactive hydrocarbons are olefins, toluene, xylene, ethyltoluene, and isopropyltoluene. Examples of non-reactive hydrocarbons are: isopentane, butane and hexane. It is preferred that benzene be absent from the feed as its presence has an adverse effect on the degree of disproportionation.

The process utilizes substantially anhydrous liquid hydrogen fluoride. The liquid hydrogen fluoride should not contain more than about 2 or 3% of water. Commercial grade anhydrous hydrofluoric acid is suitable for this process.

Under the conditions of the process, polyethylbenzenes form a complex containing 1 mole of $BF_3$ and, it is believed, 1 mole of HF. Therefore, at least enough liquid HF must be present to participate in the formation of the complex with the polyethylbenzene; in addition to this amount, sufficient liquid HF must be present to dissolve the complex which has been formed. In general, the presence of a distinct separate acid phase in the contacting zone indicates that at least the minimum requirement of liquid HF has been met. More than this minimum amount of liquid HF is desirable. Usually between about 3 and 50 moles of liquid HF are utilized per mole of ethylbenzene charged to the process. It is preferred to operate with between about 6 and 12 moles of liquid HF per mole of ethylbenzene charged.

The process requires the presence of at least an amount of boron trifluoride sufficient to cause the disproportionation reaction to take place. While amounts of $BF_3$ as small as 0.1 mole per mole of ethylbenzene charged will cause an appreciable amount of disproportionation to take place, it is desirable to operate with at least about 0.4 mole of $BF_3$. More $BF_3$ has a beneficial effect on the degree of the disproportionation reaction. It is preferred to use about 1 mole per mole of ethylbenzene in the feed even though as much as 3 or more moles may be used.

The process may be operated with two liquid phases present in the contacting zone. At high $BF_3$ usages, a gas phase may also be present in the contacting zone. The two liquid phases will be spoken of herein as the raffinate phase and the acid phase. The acid phase consists of liquid HF, $BF_3$, complex and physically dissolved hydrocarbons. The raffinate phase may be ethylbenzene in excess of that amount taken into the acid phase, or may be a mixture of ethylbenzene and inert hydrocarbons, or may be principally inert hydrocarbons. In the absence of substantial amounts of inert hydrocarbons, the amount of raffinate phase is dependent upon the amount of $BF_3$ utilized. When using at least about 0.4 mole of $BF_3$ per mole of ethylbenzene, and in the substantial absence of inert hydrocarbons, all or virtually all the unreacted ethylbenzene will be taken into the acid phase either in the form of a complex or in solution. The presence of $HF$-$BF_3$-polyethylbenzene complex in liquid $HF$ very greatly increases the solubility of the liquid $HF$ for aromatic hydrocarbons and increases slightly the solubility of paraffinic hydrocarbons.

The presence of a raffinate phase consisting principally of inert hydrocarbons, such as benzene and paraffins, has an adverse effect on the degree and direction of conversion of the ethylbenzene charged, even though theoretically sufficient $BF_3$ is present to complex all of the polyethylbenzene formable. A substantial amount of the ethylbenzene will remain in the raffinate phase, even when using somewhat more than 0.4 mole of $BF_3$ per mole of ethylbenzene groups charged. All the ethylbenzene in the raffinate phase does not undergo a rearrangement reaction, even under conditions of good agitation. (The presence of dissolved inert hydrocarbons in the acid phase does not appear to have any adverse effect on the degree or direction of the rearrangement reactions.)

In order to maximize the yield of conversion products, it is preferred to operate under conditions which form a single essentially homogeneous liquid phase in the contacting zone. A single essentially homogeneous liquid phase is attainable with a feed containing as much as three volume percent of paraffinic hydrocarbons. Large amounts of benzene may be dissolved in the acid phase, as much as 1 mole or more, per mole of complexed polyethylbenzene, depending on the amount of complex in the acid phase. (It is to be understood that a separate gaseous $BF_3$ phase may also be present, but it is preferred that a minimum of free space be present in the contacting zone and that sufficient pressure be maintained to insure that essentially all the $BF_3$ is either in the complexed form or is in physical solution in the acid phase.)

The reaction product mixture may be recovered from the acid phase by various methods. Probably the simplest procedure and one most suitable for laboratory work consists of adding the acid phase to crushed ice; or the acid phase may be contacted wtih cold aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any remaining $HF$ and $BF_3$ occluded therein.

Both $HF$ and $BF_3$ are relatively expensive chemicals and it is desirable in an economic process to recover these and to recycle them for reuse in the process. The $HF$ and $BF_3$ may be readily removed from the acid phase by heating the acid phase or by applying a vacuum thereto. The $HF$ and the $BF_3$ distill overhead and may be recovered for reuse in the process.

EXAMPLES

The results obtainable by the invention are illustrated by several examples set out below. The runs were carried out using a carbon steel reactor provided with a 1725 R. P. M. stirrer. The order of addition of materials to the reactor was: (1) ethylbenzene of CP quality, (2) commercial grade anhydrous liquid $HF$ and (3) commercial grade $BF_3$. The contents of the reactor were agitated during the addition of the $HF$ and $BF_3$; the agitation was continued while the reactor was brought to the desired contacting temperature and was maintained during the contacting time. The contents of the reactor were withdrawn into a vessel filled with crushed ice. An upper aqueous hydrocarbon layer formed above a lower aqueous layer. The hydrocarbon layer was decanted and washed with dilute ammonium hydroxide solution to remove $HF$ and $BF_3$. The neutral hydrocarbons were water washed to remove traces of ammonium hydroxide.

The reaction product hydrocarbons were fractionated in a laboratory distillation column provided with about 30 theoretical plates. Each product fraction was analyzed by a combination of boiling point, specific gravity, refractive index, and ultraviolet and infrared techniques.

The results of these runs are set out in Table 1.

*Table 1*

| Run No. | I | II | III | IV |
|---|---|---|---|---|
| Temperature, °C | 50 | 80 | 100 | 135 |
| Time, Minutes | 30 | 30 | 30 | 30 |
| Ethylbenzene, moles | 2.86 | 2.54 | 2.84 | 3.71 |
| HF, moles | 35 | 35 | 28 | 35 |
| $BF_3$, moles | 3.50 | 2.94 | 3.75 | 3.75 |
| HF/Ethylbenzene | 12.2 | 13.8 | 9.8 | 9.4 |
| $BF_3$/Ethylbenzene | 1.22 | 1.16 | 1.32 | 1.00 |
| Reaction Product, mole percent: | | | | |
| Benzene | 49 | 60 | 56 | 60 |
| Ethylbenzene | 8 | 4 | 4 | 2 |
| 1,3-diethylbenzene | 35 | 13 | 15 | 15 |
| 1,3,5-triethylbenzene | 8 | 23 | 25 | 23 |
| Percent disproportionation | 92 | 96 | 96 | 98 |
| Fraction to di- | 69 | 30 | 23 | 30 |
| Fraction to tri- | 31 | 70 | 77 | 70 |

Within the limits of experimental error, the physical properties and the infrared spectra show the diethylbenzene product fraction to be the single isomer 1,3-diethylbenzene; and the triethylbenzene fraction to be the single isomer 1,3,5-triethylbenzene. In none of these tests was there found any polyethylbenzene having more than 3 ethyl groups.

Under the conditions of these experiments, essentially the only difference between the runs was the temperature of contacting. In run I, which was carried out at 50° C., only 31% of the ethylbenzene which disproportionated was converted to the triethylbenzene; the molar ratio of triethylbenzene to diethylbenzene in the reaction product mixture was about 1:4. At the 80° C. temperature of run II, the polyethylbenzene product distribution changed completely. In run II, 70% of the ethylbenzene which disproportionated went to produce triethylbenzene, i. e., just about the reverse of the results of run I. Runs III and IV which were carried out at 100° C. and 135° C. respectively, show that the reaction product attains a substantially constant distribution with about 97% of the ethylbenzene charged disproportionated. It appears that the substantially constant product distribution contains a mole ratio of triethylbenzene to diethylbenzene of about 23:15, which represents about 70% disproportionation of the ethylbenzene to 1,3,5-triethylbenzene.

It is seen that by proper control of operating conditions, particularly temperature and time, it is possible to convert ethylbenzene directly to a reaction product mixture containing both diethylbenzene and triethylbenzene and wherein the triethylbenzene component predominates over the diethylbenzene component. Furthermore, it is possible to attain a reaction product mixture having an essentially constant distribution of polyethylbenzenes which may or may not be an equilibrium condition.

Thus, having described the invention, what is claimed is:

1. A disproportionation process which comprises contacting ethylbenzene, in the absence of reactive hydrocarbons, under substantially anhydrous conditions, with at least about 3 moles of liquid $HF$ and with at least about 0.4 moles of $BF_3$ respectively per mole of ethylbenzene at a temperature of at least 75° C. for about a time at least one-half hour, thereby producing a reaction product mixture wherein triethylbenzene predominates over diethylbenzene and removing $HF$ and $BF_3$ to obtain a reaction product mixture comprising essentially benzene, ethylbenzene, 1,3-diethylbenzene and 1,3,5-triethylbenzene.

2. The process of claim 1 wherein said liquid $HF$ is present in an amount between about 6 and about 12 moles per mole of ethylbenzene.

3. The process of claim 1 wherein said BF₃ is present in an amount of about 1 mole per mole of ethylbenzene.

4. A disproportionation process which comprises contacting, under substantially anhydrous conditions, a feed comprising essentially ethylbenzene with between about 3 and 50 moles of liquid HF per mole of ethylbenzene in said feed and with between about 0.4 and 3 moles of BF₃ per mole of ethylbenzene in said feed at a temperature between about 80° C. and about 140° C. for a time between about one-half hour and about 3 minutes, the longer times corresponding to the lower temperatures, and removing HF and BF₃ to recover a reaction product mixture comprising essentially benzene, ethylbenzene, 1,3-diethylbenzene, and 1,3,5-triethylbenzene wherein the mole ratio of said triethylbenzene to said diethylbenzene is about 23:15.

5. The process of claim 4 wherein the amount of liquid HF is between about 6 and 12 moles per mole of ethylbenzene and the amount of BF₃ is about 1 mole per mole of ethylbenzene.

6. The process of claim 4 wherein said temperature is about 100° C. and said time is about 15 minutes.

References Cited in the file of this patent

UNITED STATES PATENTS

| | | |
|---|---|---|
| 2,528,893 | Lien et al. | Nov. 7, 1950 |
| 2,564,073 | Lien et al. | Aug. 14, 1951 |
| 2,644,017 | McCaulay et al. | June 30, 1953 |
| 2,683,759 | McCaulay et al. | July 13, 1954 |